United States Patent [19]
Lee

[11] Patent Number: 5,997,267
[45] Date of Patent: Dec. 7, 1999

[54] NON-ELECTROMAGNETIC INTERFERENCE GENERATING COOLING FAN

[76] Inventor: Richard Lee, 7F., No. 152-1, Sec. 7, Chung-Shan N. Road, Taipei, Taiwan

[21] Appl. No.: 08/815,607

[22] Filed: Mar. 12, 1997

[51] Int. Cl.[6] .................................................. F04B 35/04
[52] U.S. Cl. .................................. 417/423.7; 417/423.14
[58] Field of Search .............................. 417/423.1, 423.7, 417/423.14

[56] References Cited

U.S. PATENT DOCUMENTS

| | | | |
|---|---|---|---|
| 3,700,358 | 10/1972 | Papst et al. | 417/423.1 |
| 4,428,719 | 1/1984 | Hayashibara et al. | 417/423.7 |
| 4,519,010 | 5/1985 | Elsaesser et al. | 360/97 |
| 4,604,665 | 8/1986 | Muller et al. | 360/97 |
| 5,176,509 | 1/1993 | Schmider et al. | 417/423.7 |

*Primary Examiner*—Charles G. Freay
*Attorney, Agent, or Firm*—A & J

[57] ABSTRACT

A non-electromagnetic interference generating cooling fan includes a case, an impeller pivotally fitted within the case and formed with a cylindrical recess, a magnetic conductive sleeve fixedly arranged within the cylindrical recess thereby enclosing a bottom and vertical surface of the cylindrical recess, an annular ring-like rotor made of permanent magnet fixedly fitted within the sleeve, a stator fitted within the rotor, and a multi-layer printed circuit board fixedly mounted on a top of the stator and within the case, whereby the rotor and stator are enclosed within a magnetic conductive device so as to prevent the magnetic lines of force from getting out of the fan thereby keeping a computer from electromagnetic interference.

3 Claims, 5 Drawing Sheets

NON-ELECTROMAGNETIC INTERFERENCE GENERATING COOLING FAN

BACKGROUND OF THE INVENTION

1. Field of the Invention

This invention is related to a cooling fan and in particular to one which will not generate electromagnetic interference.

2. Description of the Prior Art

It has been found that the conventional cooling fan for computers is simply a small D.C. brushless motor provided with blades for making a current of air. Basically, such a D.C. brushless motor can achieve the purpose of cooling the components inside a computer, but as the motor includes a rotor made of permanent magnet and a stator made of a ferrite core with copper wire windings, the motor will generate electromagnetic interference thereby influencing the normal operation of the microprocessor and causing read/write errors of hard and floppy disk drives, CD rom, or the like.

Therefore, it is an object of the present invention to provide a non-electromagnetic interference generating cooling fan which can obviate and mitigate the above-mentioned drawbacks.

SUMMARY OF THE INVENTION

This invention is related to an improved cooling fan especially designed for use in computers.

It is the primary object of the present invention to provide a cooling fan wherein the rotor and stator are enclosed within a magnetic conductive means so as to prevent the magnetic lines of force from getting out of the fan thereby keeping a computer from electromagnetic interference.

It is another object of the present invention to provide a cooling fan which utilizes a magnetic conductive sleeve to enclose the bottom and vertical outer surface of the rotor and a multi-layer printed circuit board to cover the top of the rotor and the stator wherein one whole layer of the multi-layer printed circuit board is grounded so that the magnetic interference generated by the cooling fan will not escape through the space to interfere a computer or other computer-based instruments.

It is a further object of the present invention to provide a cooling fan utilizing a ferrite core arranged on the power input of a multi-layer printed circuit board and provided with copper wire windings to form a suppressor for preventing electromagnetic interference from escaping outside through conducting wires thereby ensuring the normal operation of a computer.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numberals refer to identical or similar parts.

BRIEF DESCRIPTION OF THE DRAWINGS

The invention is further described hereafter, by way of example only, with reference to the accompanying drawings, in which.

DETAILED DESCRIPTION OF THE PREFERRED EMBODIMENT

Figure 1:
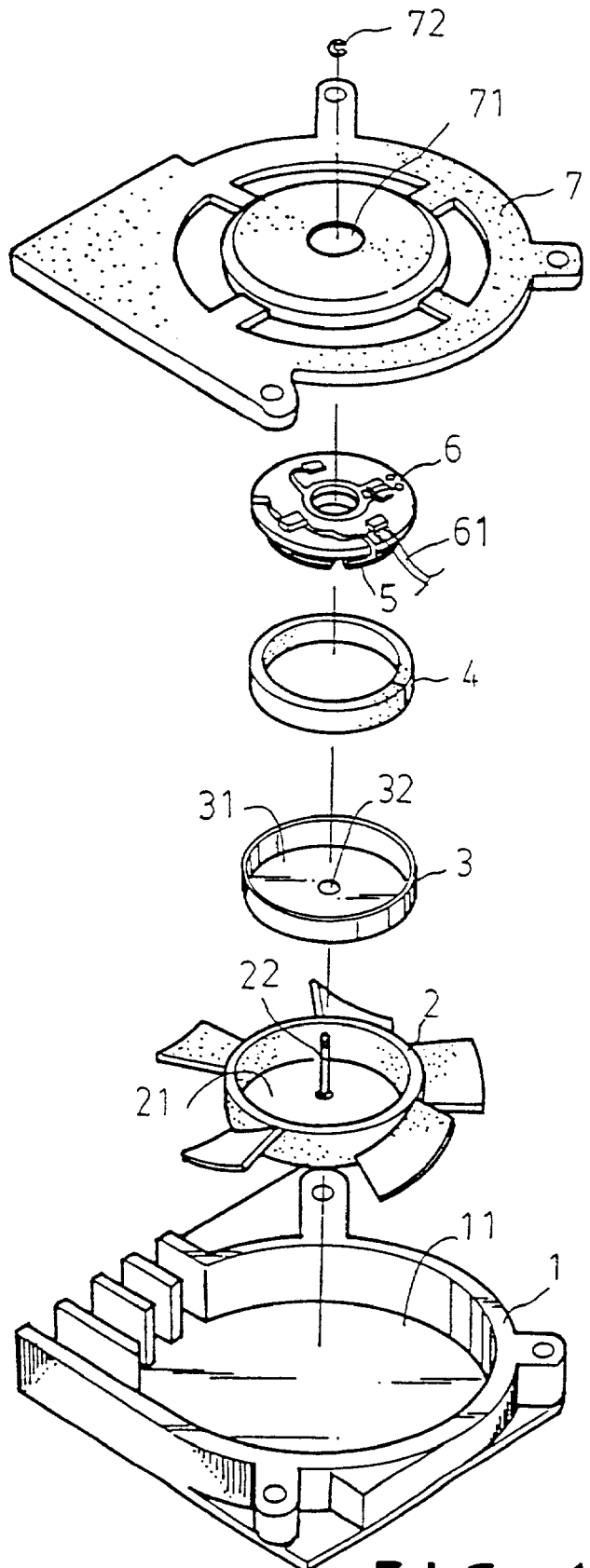
FIG. 1 is an exploded view of a first preferred embodiment according to the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

The present invention resides in a non-electromagnetic interference generating cooling fan, wherein the rotor made of permanent magnet is enclosed within a magnetic conductive sleeve at the bottom and vertical outer surface and the stator made of a ferrite core with copper wire windings is covered at the top by a screen means, thereby keeping the magnetic lines of force from getting out of the fan and therefore preventing the components inside a computer from being interfered.

Figure 7:
FIG. 7 illustrates wiring of the multi-layer printed circuit board.

With reference to the drawings and in particular to FIG. 1 thereof, the cooling fan according to the present invention comprises a case 1, an impeller 2, a magnetic conductive sleeve 3, a rotor 4, a stator 5, a printed circuit board 6 and a cover 7. The base 1 is a metallic or plastic member formed with a generally circular recess 11 in which is fitted the impeller 2. The impeller 2 is made of reinforced plastic and has a cylindrical cavity 21 provided with a vertical axle 22 at the center thereof. Hence, when the vertical axle 22 is rotated, the impeller 2 will be rotated therewith. The magnetic conductive sleeve 3 is circular Chamber with an open top and has a center hole 32. The magnetic conductive sleeve 3 is fixedly fitted within the cylindrical cavity 21 of the impeller 2, with the center hole 32 of the former receiving the vertical axle 22 of the latter. The rotor 4 is an annular ring-like member made of permanent magnet which is fixedly mounted within the magnetic conductive sleeve 3 by adhesive or otherwise secured therein by any other means well known to the art so that the bottom and vertical outer surface of the rotor 4 are completely enclosed within the magnetic conductive sleeve 3. The stator 5 is installed within the rotor 4 and made of a ferrite core with copper wire windings. The structure of the stator 5 may be of any design well known to those having ordinary skill in the art and is not considered a part-of the invention. The printed circuit board 6 is a multi-layer board with at least four layers of copper foil The printed circuit board 6 is fixedly disposed on the top of the stator 5 and has an area completely covering the top of the stator 5 and rotor 4. Furthermore, a whole layer of the printed circuit board 6 is designed for grounding purpose (see FIG. 7). The cover 7 is fixedly mounted on the case 1 and fixedly connected with the printed circuit board 6. The cover 7 is formed with a center hole 71 for the passage of the vertical axle 22 of the impeller 2. A retainer 7 is engaged with the upper end of the vertical axle 22 of the impeller 2 so that the impeller 2 together with the magnetic conductive sleeve 3 and the rotor 4 can freely rotate with respect to the stator 5.

As the multi-layer printed circuit board 6 is connected to a power supply (not shown) via conducting lines 61, the rotor 4 will rotate in unison with the impeller 2 thus making a rapidly moving current of air to cool the interior of a computer so that the computer may be kept working under a preset temperature.

The present invention utilizes a sleeve 3 made of magnetic conductive material to enclose the bottom and vertical outer surface of the rotor 4 and a multi-layer printed circuit board 6 to the top of the rotor 4 and stator 5 wherein one whole layer of the printed circuit board 6 is grounded thereby completely sealing the magnetic lines of force generated by the rotor 4 and stator 5 within the case 1 and keeping a computer from electromagnetic interference.

Figure 2:
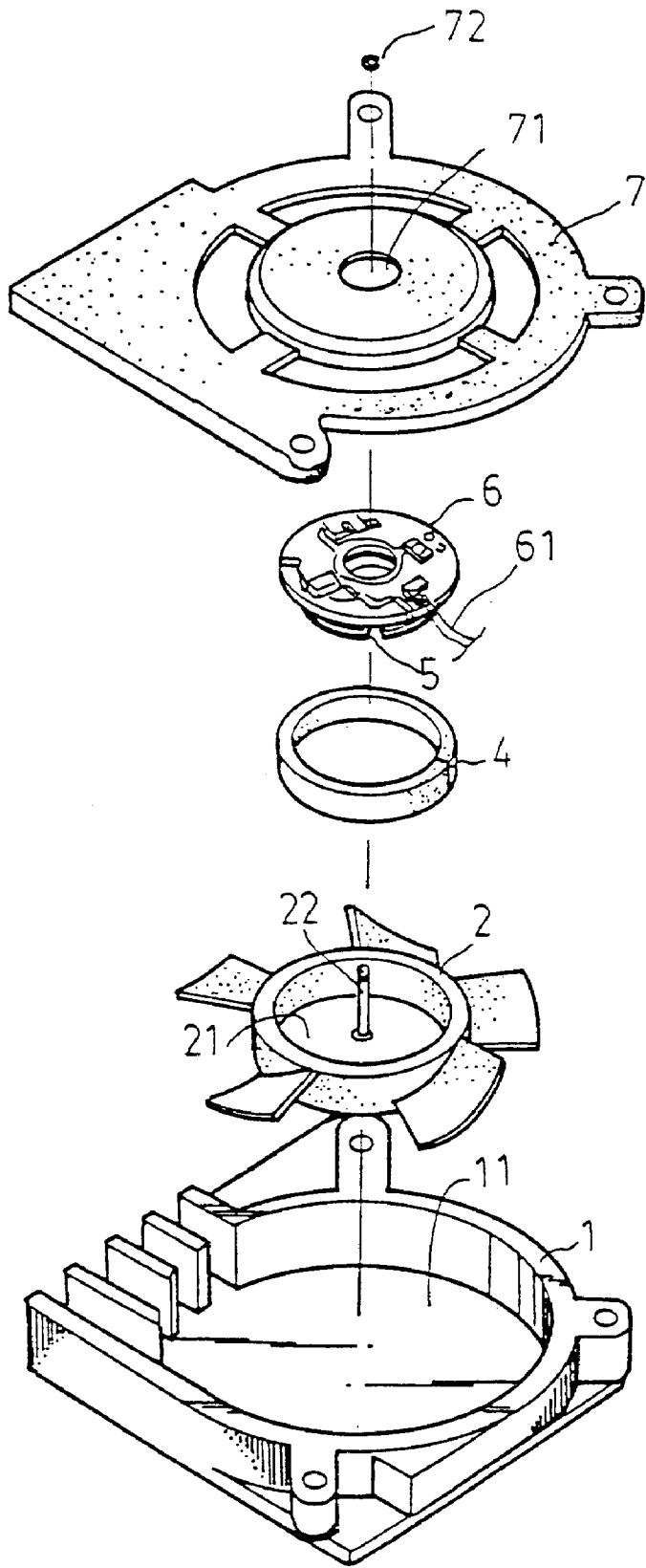
FIG. 2 is an exploded view of a second preferred embodiment according to the present invention.

FIG. 2 is an exploded view of a second preferred embodiment of the present invention. As illustrated, the impeller 2 is made of conductive plastic so that the magnetic conductive sleeve 3 can be omitted. The working principle of the second preferred embodiment is the same as that of the first preferred embodiment and has no need to be repeatedly described herein.

Figure 3:
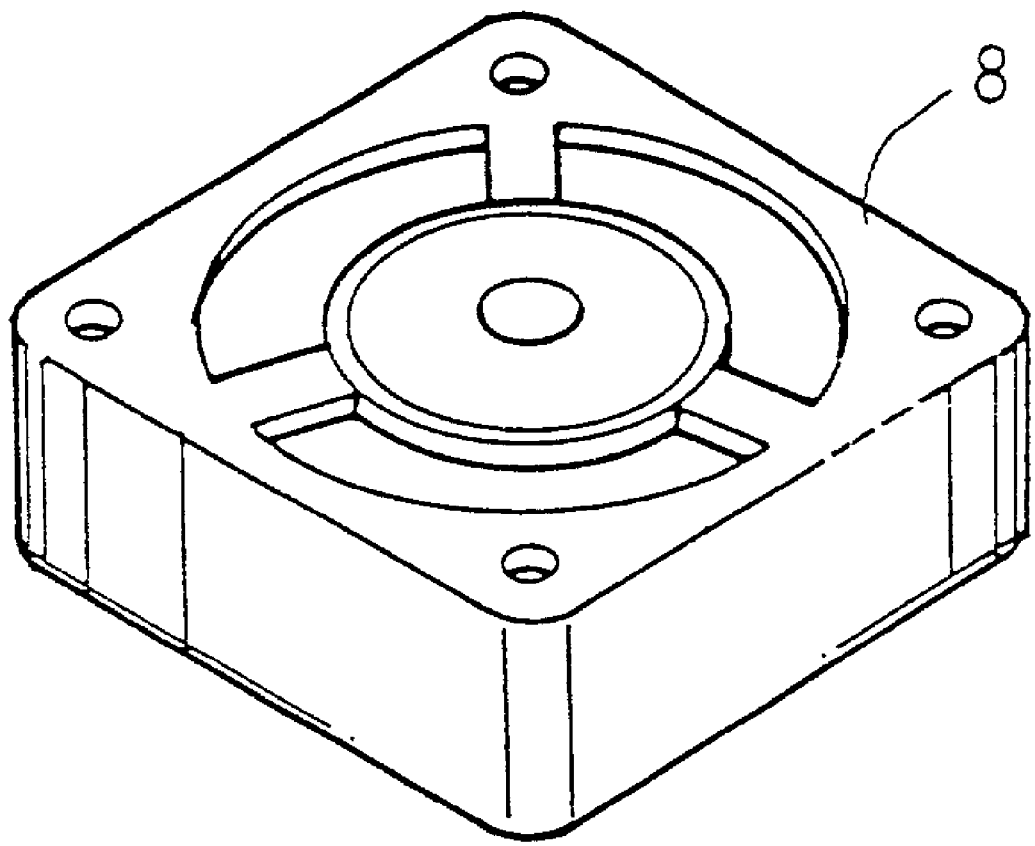
FIG. 3 is a perspective view of a third preferred embodiment according to the present invention.

FIG. 3 is an exploded view of a third preferred embodiment of the present invention. As shown, the case 8 is generally rectangular in shape.

Figure 4:
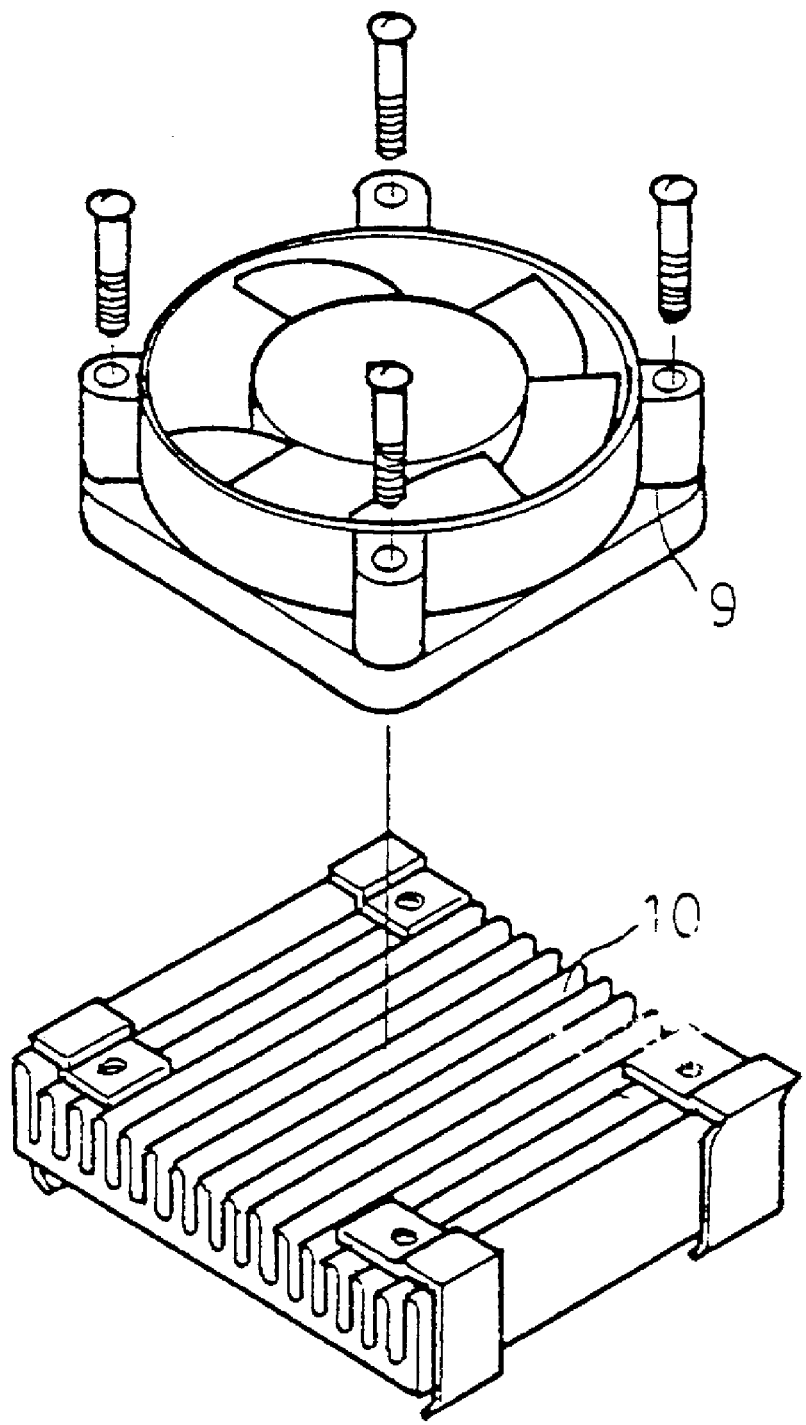
FIG. 4 is an exploded view of a fourth preferred embodiment according to the present invention.

FIG. 4 is an exploded view of a fourth preferred embodiment of the present invention. As can be seen, the case 9 is generally circular in shape (i.e. the shape of a commonly used box fan) and provided with a heat sink 10 thereunder.

Figure 5:
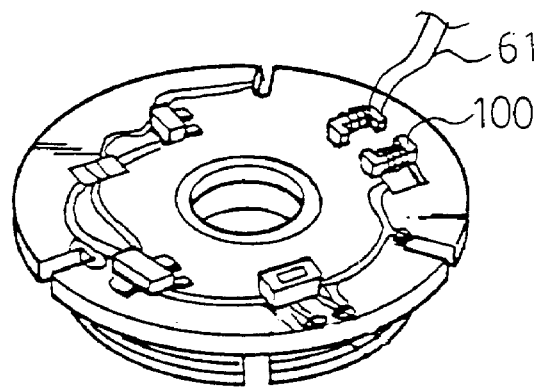
FIG. 5 illustrates a fifth preferred embodiment according to the present invention.

FIG. 5 illustrates a fifth preferred embodiment of the present invention. As illustrated, the multi-layer printed circuit board has a ferrite core 100 which is provided with copper wire windings and used as a suppressor for preventing electromagnetic interference from getting out of the cooling fan via conducting lines.

Figure 6:
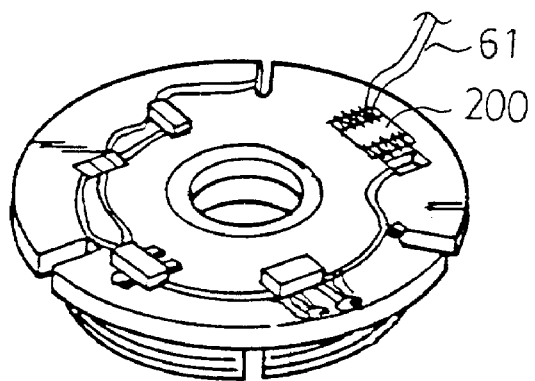
FIG. 6 illustrates a sixth preferred embodiment according to the present invention.

FIG. 6 illustrates a sixth preferred embodiment of the present invention. As shown, the multi-layer printed circuit board 6 is made of ceramic on which are printed the ferrite core 200 and windings thereby reducing the thickness and making it more compact in size.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A non-electromagnetic interference generating cooling fan comprising:

a case;

an impeller rotatably mounted within said case and formed with a cylindrical recess;

a magnetic conductive sleeve fixedly arranged within said cylindrical recess;

an annular ring-like rotor made of a permanent magnet fixedly fitted within said sleeve and having a bottom and vertical surface enclosed by said sleeve;

a stator mounted within said rotor; and a multi-layer printed circuit board fixedly mounted on a top of said stator and within said case.

2. The non-electromagnetic interference generating cooling fan as claimed in claim 1, wherein said multi-layer printed circuit board is made of ceramic.

3. The non-electromagnetic interference generating cooling fan as claimed in claim 1, wherein said multi-layer printed circuit board is printed with a ferrite core with copper windings.

* * * * *